United States Patent [19]
Huang

[11] Patent Number: 5,954,538
[45] Date of Patent: Sep. 21, 1999

[54] SET OF HARNESSES FOR INTERCONNECTING A PLURALITY OF ORNAMENTAL LIGHT FIXTURES IN A VEHICLE

[75] Inventor: Nan Huang Huang, Rancho Palos Verdes, Calif.

[73] Assignee: Grand General Accessories Manufacturing Inc., Compton, Calif.

[21] Appl. No.: 08/902,440

[22] Filed: Jul. 28, 1997

[51] Int. Cl.[6] .................................................. H01R 11/00
[52] U.S. Cl. .......................................................... 439/502
[58] Field of Search ................................... 439/502, 503, 439/505, 623, 651, 654

[56] References Cited

U.S. PATENT DOCUMENTS

| | | | |
|---|---|---|---|
| 4,280,062 | 7/1981 | Miller et al. | 439/505 |
| 4,846,697 | 7/1989 | Rodgers | 439/623 |
| 5,829,129 | 11/1998 | Ito | 439/502 |

*Primary Examiner*—Neil Abrams
*Assistant Examiner*—Barry M. L. Standig
*Attorney, Agent, or Firm*—Thomas I. Rozsa; Tony D. Chen; Jerry Fong

[57] ABSTRACT

A set of wire harnesses for the interconnection of a plurality of light fixtures, for example, ornamental light fixtures, turn signal lights, marker lights and etc., for vehicles. Each light fixture has a connector base with two or more female sockets. The set of wire harnesses include four types of wire harnesses. The first type of wire harness comprises two terminal contacts, a male connector, and conducting wires connecting the terminal contacts to the male connector. The male connector of the first type of wire harness has two or more male prongs. The second type of wire harness comprises two configurations. The first configuration includes a pair of male connectors, a female connector, and conducting wires connecting the male and female connectors. The second configuration includes a pair of female connectors, a male connector, and conducting wires connecting the male and female connectors. Each of the male connectors of the first and second configurations of the second type of wire harness has two or more male prongs. Each of the female connectors of the first and second configurations of the second type of wire harness has two or more corresponding sockets. The third type of wire harness comprises two male connectors and conducting wires connecting the two male connectors. Each male connector of the third type of wire harness has two or more male prongs.

25 Claims, 2 Drawing Sheets

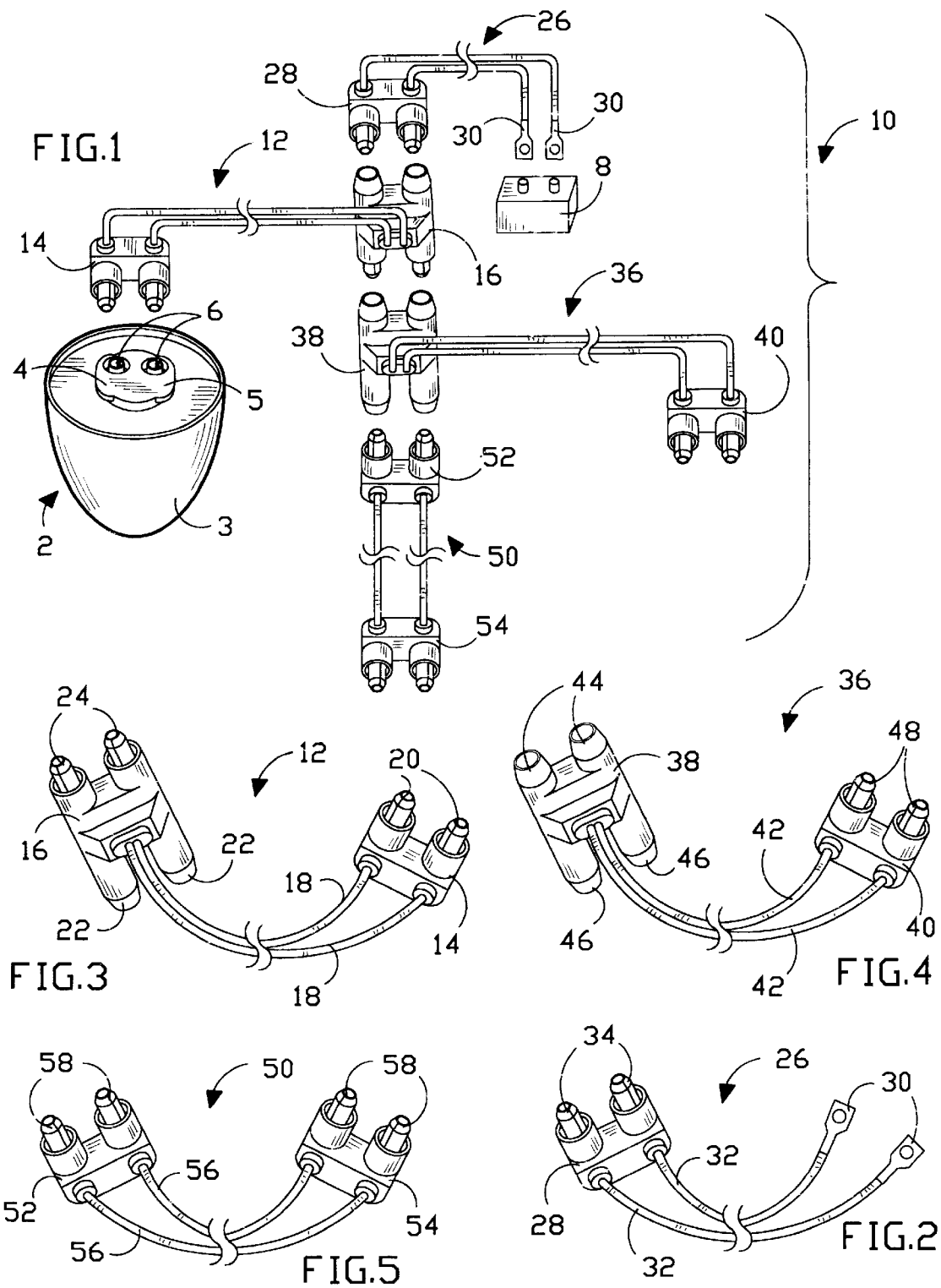

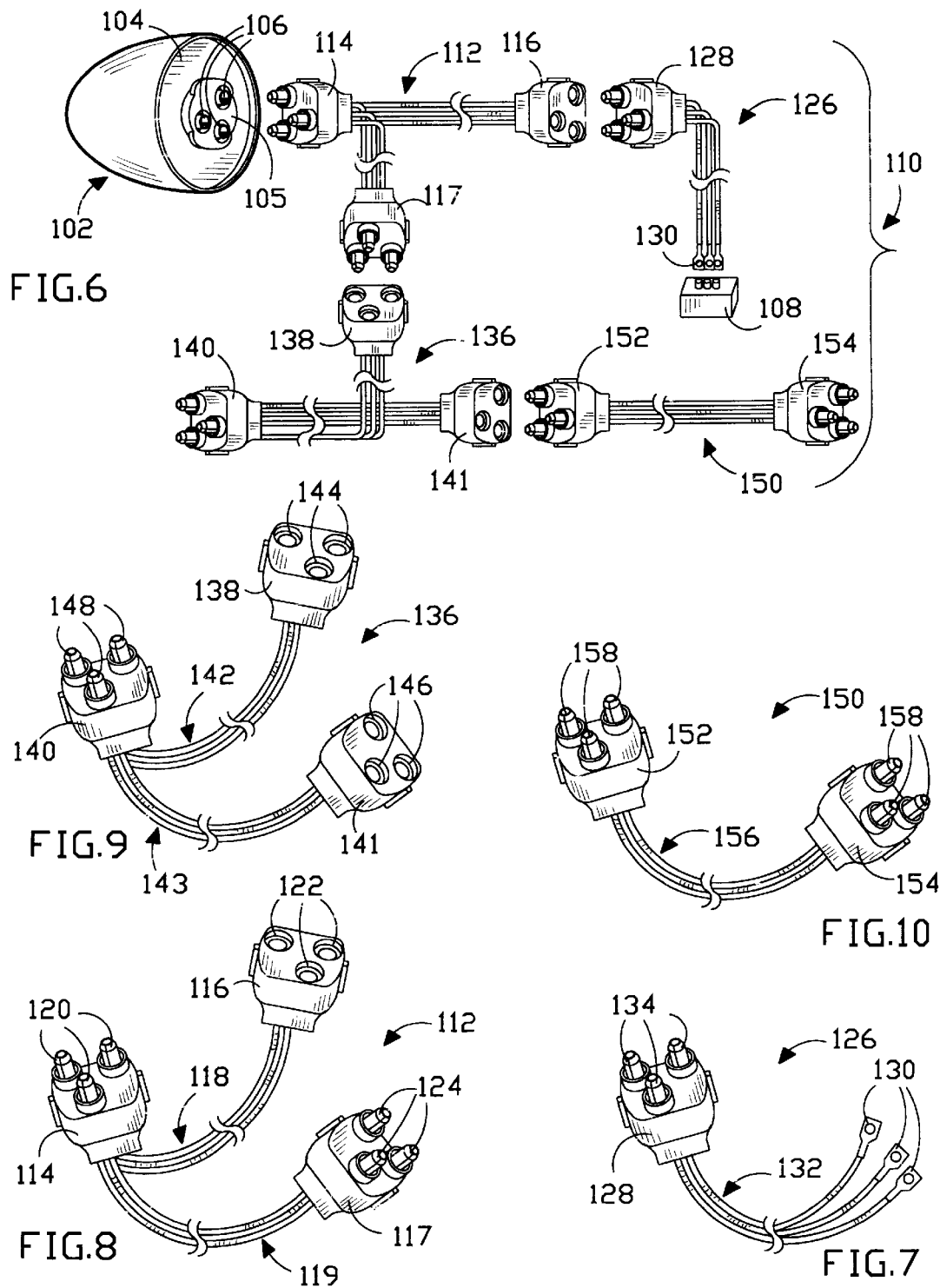

5,954,538

SET OF HARNESSES FOR INTERCONNECTING A PLURALITY OF ORNAMENTAL LIGHT FIXTURES IN A VEHICLE

BACKGROUND OF THE INVENTION

1. Field of the Invention

The present invention generally relates to the field of vehicle accessories. More particularly, the present invention relates to the field of wire harnesses for the interconnection of a plurality of light fixtures, e.g., turn signal lights, marker lights and etc., for vehicles.

2. Description of the Prior Art

Generally, most prior art vehicle light fixtures are usually installed by the manufacturers and are electrically intercoelected in advance in a vehicle. These light fixtures are typically connected by a main wire harness having a plurality of branch wires branched-off from a primary wire bundle. Each branch wire has a connector or plug for connecting to a particular light fixture. One problem with prior art wire harnesses is that they are specifically designed and arranged to interconnected a certain amount of vehicle light fixtures on a vehicle, and thereby not allowing a person to add additional vehicle light fixtures onto the vehicle. Furthermore, to add additional vehicle light fixtures, a person usually has to add additional wiring to the main wire harness by slicing the main wire harness to add the additional wires to connected the additional vehicle light fixtures.

It is desirable to have a very efficient and also very effective design and construction of a set of wire harnesses for interconnecting any desired number of vehicle light fixtures on a vehicle, with the capability of adding additional vehicle light fixtures to the main wire harness in a much more efficient way.

SUMMARY OF THE INVENTION

The present invention is a novel and unique set of wire harnesses for the interconnection of a plurality of light fixtures, for example, ornamental light fixtures, turn signal lights, marker lights and etc., for vehicles. Each light fixture has a connector base means with two or more female sockets.

The set of wire harnesses include four types of wire harnesses. These wire harnesses can be quickly connected or disconnected as a unit at plugging junctions.

In the preferred embodiment of the present invention, the set of wire harnesses include a first type of wire harnesses, a second type of wire harnesses, and a third type of wire harnesses. Each first type of wire harness comprises two terminal contacts, a male connector, and conducting wires connecting the terminal contacts to the male connector. The terminal contacts are adapted for respective connection to a power source. The male connector of each first type of wire harness has two male prongs. Each second type of wire harness comprises two configurations. The first configuration includes a pair of male connectors, a female connector, and conducting wires connecting the male and female connectors. The second configuration includes a pair of female connectors, a male connector, and conducting wires connecting the male and female connectors. Each of the male connectors of the first and second configurations of each second type of wire harness has two male prongs. Each of the female connectors of the first and second configurations of each second type of wire harness has two corresponding sockets. Each third type of wire harness comprises two male connectors and conducting wires connecting the two male connectors. Each male connector of each third type of wire harness has two male prongs.

In an alternative embodiment of the present invention, the set of wire harnesses include a first type of wire harnesses, a second type of wire harnesses, and a third type of wire harnesses. Each first type of wire harness comprises three terminal contacts, a male connector, and conducting wires connecting the terminal contacts to the male connector. The terminal contacts are adapted for respective connection to a power source. The male connector of the first type of wire harness has three male prongs. Each second type of wire harness comprises two configurations. The first configuration includes a pair of male connectors, a female connector, and conducting wires connecting the male and female connectors. The second configuration includes a pair of female connectors, a male connector, and conducting wires connecting the male and female connectors. Each of the male connectors of the first and second configurations of each second type of wire harness has three male prongs. Each of the female connectors of the first and second configurations of each second type of wire harness has three corresponding sockets. Each third type of wire harness comprises two male connectors and conducting wires connecting the two male connectors. Each male connector of the third type of wire harness has three male prongs.

It is an object of the present invention to provide a set of wire harnesses for interconnecting any desired of number vehicle light fixtures on a vehicle, with the capability of adding additional vehicle light fixtures to a main wire harness.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is an exploded perspective view of the preferred embodiment of the present invention set of wire harnesses for interconnecting any desired number of vehicle light fixtures having at least two prongs or sockets;

FIG. 2 is a perspective view of a first type of wire harness of the present invention set of wire harnesses;

FIG. 3 is a perspective view of a first arrangement of a second type of wire harness of the present invention set of wire harnesses;

FIG. 4 is a perspective view of a second arrangement of the second type of wire harness of the present invention set of wire harnesses;

FIG. 5 is a perspective view of a third type of wire harness of the present invention set of wire harnesses;

FIG. 6 is an exploded perspective view of an alternative embodiment of the present invention set of wire harnesses for interconnecting any desired number of vehicle light fixtures having at least three prongs or sockets;

FIG. 7 is a perspective view of a first type of wire harness of the present invention shown in FIG. 6;

FIG. 8 is a perspective view of a first arrangement of a second type of wire harness of the present invention shown in FIG. 6;

FIG. 9 is a perspective view of a second arrangement of the second type of wire harness of the present invention shown in FIG. 6; and FIG. 10 is a perspective view of a third type of wire harness of the present invention shown in FIG. 6.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is depicted at 10 a preferred embodiment of the present invention set of wire harnesses for the interconnection of a plurality of vehicle light fixtures 2 (only one is shown) on a vehicle (not shown), such as a truck, trailer or etc. Each light fixture 2 has a generally dome-shaped lens 3 and a base 4 permanently affixed to the open end of the dome-shaped lens 3. A connector means 5 is adapted to be permanently affixed to the base 4 and has a pair of female sockets 6.

Referring to FIGS. 1 and 2, there is depicted a first type of wire harness 26 which comprises a male connector 28, a pair of terminal contacts 30, and a pair of electrical wires 32 electrically connecting the male connector 28 to the pair of terminal contacts 30. The male connector 28 has a pair of male prongs 34. The pair of terminal contacts 30 are adapted for respectively connecting to a power source 8.

Referring to FIGS. 1 and 3, there is depicted a first arrangement 12 of a second type of wire harness which comprises a male connector 14, a male/female connector 16, and a pair of electrical wires 18 electrically connecting the male connector 14 to the male/female connector 16. The male connector 14 has a pair of male prongs 20 for respectively interconnecting to the pair of female sockets 6 of the vehicle light fixture 2. The male/female connector 16 has a pair of female sockets 22 and a pair of opposite male prongs 24. The male prongs 34 of the male connector 28 of the first type of wire harness 26 are connected to the female sockets 22 of the male/female connector 16 of the first configuration 12 of the second type of wire harness.

Referring to FIGS. 1 and 4, there is depicted a second configuration 36 of the second type of wire harness which comprises a female connector 38, a male connector 40, and a pair of electrical wires 42 electrically connecting the female connector 38 to the male connector 40. The female connector 38 has two pairs of opposite female sockets 44 and 46, wherein one pair 44 of the two pairs of female sockets are respectively interconnected to the pair of male prongs 24 of the male/female connector 16. The male connector 40 has a pair of male prongs 48 which are adapted for respectively interconnecting to the pair of female sockets 6 of another one of the plurality of vehicle light fixtures 2.

Referring to FIGS. 1 and 5, there is depicted a third type of wire harness 50 which comprises two male connectors 52 and 54, and a pair of electrical wires 56 electrically connecting the two male connectors 52 and 54. Each connector has a pair of male prongs 58, wherein the pair of the male prongs 58 of the male connector 52 are respectively interconnected to the other pair 46 of the two pairs of female sockets of the female connector 38 of the second arrangement 36 of the second type of wire harness. The pair of the male prongs 58 of the male connector 54 are adapted for respectively interconnecting to the pair of female sockets 6 of still another one of the plurality of vehicle light fixtures 2.

It will be appreciated that the present invention is not confined to the particular arrangement shown in FIG. 1. It is emphasized that while the arrangement shown in FIG. 1 is preferred, it is also within the spirit and scope of the present invention to utilized additional wire harnesses shown in FIGS. 2 through 5 to connect additional vehicle light fixtures. By adding the correct wire harnesses which are shown in FIGS. 2 through 5, the additional vehicle light fixtures can be bridged or linked to a main wire harness which is connected to the power source, thereby eliminating the need to splice the main wire harness to add additional wiring for the additional vehicle light fixtures.

It will be appreciated that the present invention is not limited to the male and female connector arrangements shown in the first, second, and third types of wire harnesses. It is also within the spirit and scope of the present invention to utilize any combination of male and female connector arrangements in the first, second and third types of wire harnesses.

Referring to FIG. 6, there is depicted at 110 an alternative embodiment of the present invention set of wire harnesses for the interconnection of a plurality of vehicle light fixtures 102 (only one is shown) on a vehicle (not shown), such as a truck, trailer or etc. Each light fixture 102 has a generally dome-shaped lens 103 and a base 104 permanently affixed to the open end of the dome-shaped lens 103. A connector means 105 is adapted to be permanently affixed to the base 104 and has three female sockets 106.

Referring to FIGS. 6 and 7, there is depicted a first type of wire harness 126 which comprises a male connector 128, three terminal contacts 130, and three electrical wires 132 electrically connecting the male connector 128 to the three terminal contacts 130. The male connector 128 has three male prongs 134. The three terminal contacts 130 are adapted for respectively connecting to a power source 108.

Referring to FIGS. 6 and 8, there is depicted a first configuration of a second type of wire harness 112 which comprises two male connectors 114 and 117, a female connector 116, a first group of three electrical wires 118 electrically connecting the male connector 114 to the female connector 116, and a second group of three electrical wires 119 electrically connecting the male connectors 114 and 117. The male connector 114 has three male prongs 120 for respectively interconnecting to the three female sockets 106 of the vehicle light fixture 102. The female connector 116 has three female sockets 122 thereto, while the male connector 117 has three male prongs 124.

Referring to FIGS. 6 and 9, there is depicted a second configuration of the second type of wire harness 136 which comprises two female connectors 138 and 141, a male connector 140, a first group of three electrical wires 142 electrically connecting the female connector 138 to the male connector 140, and a second group of three electrical wires 143 electrically connecting the male connector 140 to the female connector 141. The male connector 140 has three male prongs 148 which are adapted for respectively interconnecting to the three female sockets 106 of another one of the plurality of vehicle light fixtures 102. The female connector 138 has three female sockets 144 which are respectively received and interconnected to the three male prongs 124 of the male connector 117. The female connector 141 also has three female sockets 146.

Referring to FIGS. 1 and 10, there is depicted a third type of wire harness 150 which comprises two male connectors 152 and 154, and three electrical wires 156 electrically connecting the two male connectors 152 and 154. Each connector has three male prongs 158, wherein the three male prongs 158 of the male connector 152 are respectively interconnected to the three female sockets 146 of the female connector 141 of the second configuration 136 of the second type of wire harness. The three male prongs 158 of the other male connector 154 are adapted for respectively interconnecting to the three female sockets 106 of still another one of the plurality of vehicle light fixtures 102.

It will be appreciated that the present invention is not confined to the particular arrangement shown in FIG. 6. It is emphasized that while the arrangement shown in FIG. 6 is preferred, it is also within the spirit and scope of the present invention to utilized additional wire harnesses shown in FIGS. 7 through 10 to connect additional vehicle light fixtures. By adding the correct wire harnesses which are shown in FIGS. 7 through 10, the additional vehicle light fixtures can be bridged or linked to a main wire harness which is connected to the power source, thereby eliminating the need to splice the main wire harness to add additional wiring for the additional vehicle light fixtures.

It will be appreciated that the present invention is not limited to the male and female connector arrangements shown in the first, second, and third types of wire harnesses. It is also within the spirit and scope of the present invention to utilize any combination of male and female connector arrangements in the first, second and third types of wire harnesses.

The present invention conforms to conventional forms of manufacture or any other conventional way known to one skilled in the art, and is of simple construction and is easy to use.

Defined in detail, the present invention is a set of wire harnesses for the interconnection of a plurality of vehicle light fixtures to a power source, each vehicle light fixture having a female connector base thereon, the set of wire harnesses comprising: (a) at least one first type of wire harness having terminal contacts, a male connector, and conducting wires electrically connecting the terminal contacts with the male connector, the terminal contacts adapted for respective connection to the power source; (b) at least two second types of wire harnesses, a respective one of the at least two second types of wire harnesses having a pair of male connectors, a female connector, and conducting wires electrically connecting the pair of male and female connectors, the respective other one of the at least two second types of wire harnesses having a male connector, a pair of female connectors, and conducting wires electrically connecting the male and pair of female connectors, the female connector of the respective one of the at least two second types of wire harnesses connected to the male connector of the at least one first type of wire harness, one of the pair of male connectors of the respective one of the at least two second types of wire harnesses adapted for respective connection to the female connector base of a respective one of the plurality of vehicle light fixtures, one of the pair of female connectors of the respective other one of the at least two second types of wire harnesses connected to the other one of the pair of male connectors of the respective one of the at least two second types of wire harnesses, the male connector of the respective other one of the at least two second types of wire harness adapted for respective connection to the female connector base of the respective one of the plurality of vehicle light fixtures; and (c) at least one third type of wire harness having a pair of male connectors and conducting wires electrically connecting the pair of male connectors, one of the pair of male connector connected to the other one of the pair of female connectors of the respective other one of the at least two second types of wire harnesses, and the other one of the pair of male connectors adapted for respective connection to the female connector base of the respective one of the plurality of vehicle light fixtures.

Defined broadly, the present invention is a set of wire harnesses for the interconnection of a plurality of vehicle light fixtures to a power source, each vehicle light fixture having a connector base thereon, the set of wire harnesses comprising: (a) at least one first type of wire harness having terminal contacts, a first connector, and conducting wires electrically connecting the terminal contacts with the first connector, the terminal contacts adapted for respective connection to the power source; (b) at least two second types of wire harnesses, each of the at least two second types of wire harnesses having a first connector, a second connector, a third connector, and conductor means connecting the first, second and third connectors, the first connector of a respective one of the at least two second types of wire harnesses connected to the first connector of the at least one first type of wire harness, the second connector of the respective one of the at least two second types of wire harnesses adapted for respective connection to the connector base of a respective one of the plurality of vehicle light fixtures, the first connector of the respective other one of the at least two second types of wire harnesses connected to the third connector of the respective one of the at least two second types of wire harnesses, the second connector of the respective other one of the at least two second types of wire harness adapted for respective connection to the connector base of the respective one of the plurality of vehicle light fixtures; and (c) at least one third type of wire harness having two connectors and conductor means connecting the two connectors, one of the two connector connected to the third connector of the respective other one of the at least two second types of wire harnesses, and the other one of the two connectors adapted for respective connection to the connector base of the respective one of the plurality of vehicle light fixtures.

Defined more broadly, the present invention is a set of harnesses for the interconnection of at least two light fixtures to a power source of a vehicle, each vehicle light fixture having a plug means, the set of harnesses comprising: (a) at least one first type of harness having contact means, plug means, and conductor means connecting the contact means to the plug means, the contact means adapted for respective connection to the power source; (b) at least one second type of harness having at three plug means and conductor means connecting the at least three plug means, a respective one of the at least three plug means connected to the plug means of the at least one first type of harness, and the respective second one of the at least three plug means adapted for connection to the plug means of a respective one of the at least two light fixtures; and (c) at least one third type of wire harness having at least two plug means and conductor means connecting the at least two plug means, one of the at least two plug means connected to the respective third one of the at least three plug means of the at least one second type of harness, and the other one of the at least two plug means adapted for respective connection to the plug means of the respective other one of the at least two vehicle light fixtures.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A set of wire harnesses for the interconnection of a plurality of vehicle light fixtures to a power source, each vehicle light fixture having a female connector base thereon, the set of wire harnesses comprising:

a. At least one first type of wire harness having terminal contacts, a male connector, and conducting wires electrically connecting the terminal contacts with the male connector, the terminal contacts adapted for respective connection to said power source;

b. At least two second types of wire harnesses, a respective one of the at least two second types of wire harnesses having a pair of male connectors, a female connector, and conducting wires electrically connecting the pair of male and female connectors, the respective other one of the at least two second types of wire harnesses having a male connector, a pair of female connectors, and conducting wires electrically connecting the male and pair of female connectors, the female connector of the respective one of the at least two second types of wire harnesses connected to said male connector of said at least one first type of wire harness, one of the pair of male connectors of the respective one of the at least two second types of wire harnesses adapted for respective connection to said female connector base of a respective one of said plurality of vehicle light fixtures, one of the pair of female connectors of the respective other one of the at least two second types of wire harnesses connected to the other one of the pair of male connectors of the respective one of the at least two second types of wire harnesses, the male connector of the respective other one of the at least two second types of wire harness adapted for respective connection to said female connector base of the respective one of said plurality of vehicle light fixtures; and c. at least one third type of wire harness having a pair of male connectors and conducting wires electrically connecting the pair of male connectors, one of the pair of male connector connected to the other one of said pair of female connectors of the respective other one of said at least two second types of wire harnesses, and the other one of the pair of male connectors adapted for respective connection to said female connector base of the respective one of said plurality of vehicle light fixtures.

2. The set of wire harnesses in accordance with claim 1 wherein said male connectors each includes at least two prongs.

3. The set of wire harnesses in accordance with claim 1 wherein said male connectors each includes at least three prongs.

4. The set of wire harnesses in accordance with claim 1 wherein said female connectors each includes at least two sockets.

5. The set of wire harnesses in accordance with claim 1 wherein said female connectors each includes at least three sockets.

6. A set of wire harnesses for the interconnection of a plurality of vehicle light fixtures to a power source, each vehicle light fixture having a connector base thereon, the set of wire harnesses comprising:

a. At least one first type of wire harness having terminal contacts, a first connector, and conducting wires electrically connecting the terminal contacts with the first connector, the terminal contacts adapted for respective connection to said power source;

b. At least two second types of wire harnesses, each of the at least two second types of wire harnesses having a first connector, a second connector, a third connector, and conductor means connecting the first, second and third connectors, the first connector of a respective one of the at least two second types of wire harnesses connected to said first connector of said at least one first type of wire harness, the second connector of the respective one of the at least two second types of wire harnesses adapted for respective connection to said connector base of a respective one of said plurality of vehicle light fixtures, the first connector of the respective other one of the at least two second types of wire harnesses connected to the third connector of the respective one of the at least two second types of wire harnesses, the second connector of the respective other one of the at least two second types of wire harness adapted for respective connection to said connector base of the respective one of said plurality of vehicle light fixtures; and c. at least one third type of wire harness having two connectors and conductor means connecting the two connectors, one of the two connector connected to the third connector of the respective other one of said at least two second types of wire harnesses, and the other one of the two connectors adapted for respective connection to said connector base of the respective one of said plurality of vehicle light fixtures.

7. The set of wire harness in accordance with claim 6 wherein said first connector of said at least one first type of wire harness is a male connector.

8. The set of wire harness in accordance with claim 6 wherein said first connector of said at least one first type of wire harness is a female connector.

9. The set of wire harnesses in accordance with claim 6 wherein said first, second and third connectors of each of said at least two second types of wire harnesses are male connectors.

10. The set of wire harnesses in accordance with claim 6 wherein said first, second and third connectors of each of said at least two second types of wire harnesses are female connectors.

11. The set of wire harnesses in accordance with claim 6 wherein said first, second and third connectors of each of said at least two second types of wire harnesses include two male connectors and a female connector.

12. The set of wire harnesses in accordance with claim 6 wherein said first, second and third connectors of each of said at least two second types of wire harnesses include two female connectors and a male connector.

13. The set of wire harnesses in accordance with claim 6 wherein said two connectors of said at least one third type of wire harness are male connectors.

14. The set of wire harnesses in accordance with claim 6 wherein said two connectors of said at least one third type of wire harness are female connectors.

15. The set of wire harnesses in accordance with claim 6 wherein said two connectors of said at least one third type of wire harness include a male connector and a female connector.

16. A set of harnesses for the interconnection of at least two light fixtures to a power source of a vehicle, each vehicle light fixture having a plug means, the set of harnesses comprising:

a. at least one first type of harness having contact means, plug means, and conductor means connecting the contact means to the plug means, the contact means adapted for respective connection to said power source;

b. at least one second type of harness having at three plug means and conductor means connecting the at least three plug means, a respective one of the at least three plug means connected to said plug means of said at least one first type of harness, and the respective second one of the at least three plug means adapted for connection to said plug means of a respective one of said at least two light fixtures; and c. at least one third type of wire harness having at least two plug means and conductor means connecting the at least two plug means, one of the at least two plug means connected to the respective third one of said at least three plug means of said at least one second type of harness, and the other one of the at least two plug means adapted for respective connection to said plug means of the respective other one of said at least two vehicle light fixtures.

17. The set of harness in accordance with claim 16 wherein said plug means of said at least one first type of harness is a male plug.

18. The set of harness in accordance with claim 16 wherein said plug means of said at least one first type of harness is a female plug.

19. The set of harnesses in accordance with claim 16 wherein said at least three plug means of said at least one second type of harness are male plugs.

20. The set of harnesses in accordance with claim 16 wherein said at least three plug means of said at least one second type of harnesses are female plugs.

21. The set of harnesses in accordance with claim 16 wherein said at least three plug means of said at least one second type of harness include two male plugs and a female plug.

22. The set of harnesses in accordance with claim 16 wherein said at least three plug means of said at least one second type of harnesses include two female plugs and a male plug.

23. The set of harnesses in accordance with claim 16 wherein said at least two plug means of said at least one third type of harness are male plugs.

24. The set of harnesses in accordance with claim 16 wherein said at least two plug means of said at least one third type of harness are female connectors.

25. The set of harnesses in accordance with claim 16 wherein said at least two plug means of said at least one third type of harness include a male plug and a female plug.

* * * * *